United States Patent
Liang

(10) Patent No.: US 8,184,366 B2
(45) Date of Patent: May 22, 2012

(54) MULTI-FUNCTION MICROSCOPE DEVICE

(75) Inventor: Jie-Kai Liang, Taipei (TW)

(73) Assignee: Hajime Corporation, Tanzih Township, Taichung County (TW)

( * ) Notice: Subject to any disclaimer, the term of this patent is extended or adjusted under 35 U.S.C. 154(b) by 315 days.

(21) Appl. No.: 12/465,646

(22) Filed: May 14, 2009

(65) Prior Publication Data

US 2010/0290110 A1 Nov. 18, 2010

(51) Int. Cl.
*G02B 21/00* (2006.01)

(52) U.S. Cl. .......................................... 359/368; 359/382

(58) Field of Classification Search .................. 359/368, 359/382, 383, 385
See application file for complete search history.

(56) References Cited

U.S. PATENT DOCUMENTS

| | | | |
|---|---|---|---|
| 4,720,804 A * | 1/1988 | Moore | 359/368 |
| 4,737,016 A * | 4/1988 | Russell et al. | 359/801 |
| 5,844,714 A * | 12/1998 | DiResta | 359/368 |
| 6,628,458 B1 * | 9/2003 | Brock | 359/383 |
| 7,106,503 B2 * | 9/2006 | Vodyanoy et al. | 359/368 |
| 7,586,674 B2 * | 9/2009 | O'Connell | 359/368 |
| 7,872,796 B2 * | 1/2011 | Georgiev | 359/368 |
| 7,986,456 B2 * | 7/2011 | Frekers et al. | 359/368 |
| 2005/0063049 A1 * | 3/2005 | Steenblik et al. | 359/368 |
| 2006/0023299 A1 * | 2/2006 | Muraki | 359/368 |

* cited by examiner

*Primary Examiner* — Frank Font

(57) ABSTRACT

A multi-function microscope device comprises a main body and a light adjustment base; the main body having at least one light-emitting element, a magnetic element, and a transmitting element; a microscope lens being formed by a transparent element, a lens, and a magnetic element; a microscope device and being assembled by the lens, the main body, and the light adjustment base through the magnetic elements; a focusing element being formed by a focusing element retainer, a focus adjusting element, a cover retainer, and a cover; wherein the multi-function microscope device assembled by the microscope device and the focusing element can be arranged to a machine having a microscope equipment or a microscope frame, to be conveniently carried and used by a user as well as lowering the cost.

4 Claims, 12 Drawing Sheets

MULTI-FUNCTION MICROSCOPE DEVICE

FIELD OF THE PRESENT INVENTION

The present invention relates to microscope devices, and particular to a microscope device can be arranged to a machine having a microscope equipment or a microscope frame, to be conveniently carried and used by a user as well as lowering the cost.

DESCRIPTION OF THE PRIOR ART

Prior microscopes used for seeing microorganism, cell, or subtle structure of an object are sorted by fluorescence microscope, electron microscope, light optics microscope, and general purpose microscope. Each kind of the microscopes is applied in different field for different objects. These microscopes are generally constructed of arm on a base. On a top of the arm is an upper bracket for installing an object lens. A rotatable platform having a plurality of object lens is installed to a bottom end of the upper bracket. A base for placing an object is located opposite to the platform. By rotating the platform to switch between the object lens, user can see the object through an eyepiece. These microscopes have functions of magnifying and focusing, but there are also disadvantages needed to be corrected as described in the following.

1. The above microscopes are quite large and of high cost.
2. Each object lens has fixed magnifying factor and focal length. There are at least two object lens on the rotatable platform to be switched for specific magnifying factors. Otherwise, it is no way to change the magnifying factor.
3. Inconvenience of carrying due to a large volume.
4. Object lens with different lengths because of different focal lengths are inconveniently for carrying.

SUMMARY OF THE PRESENT INVENTION

Accordingly, a primary object of the present invention is to provide a multi-function microscope device to correct the large sizing and high cost problem.

Comparing with prior art, the present invention can be arranged to a machine having a microscope equipment or a microscope frame, to be conveniently carried and used by a user as well as lowering the cost.

DETAILED DESCRIPTION OF THE INVENTION

Figure 1:
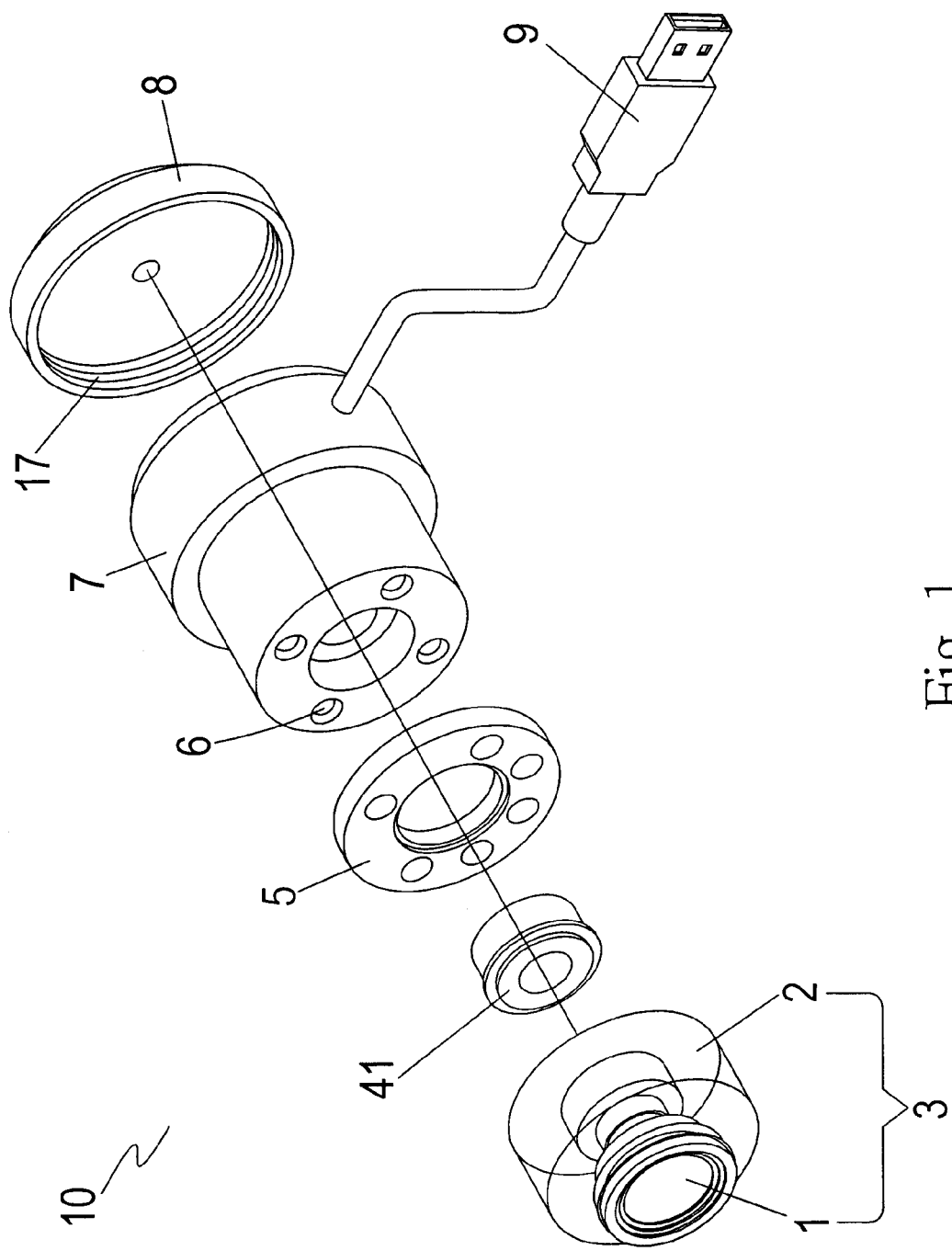
FIG. 1 is a schematic view showing a structural appearance of a microscope device of a multi-function microscope device according to the present invention.
Figure 2:
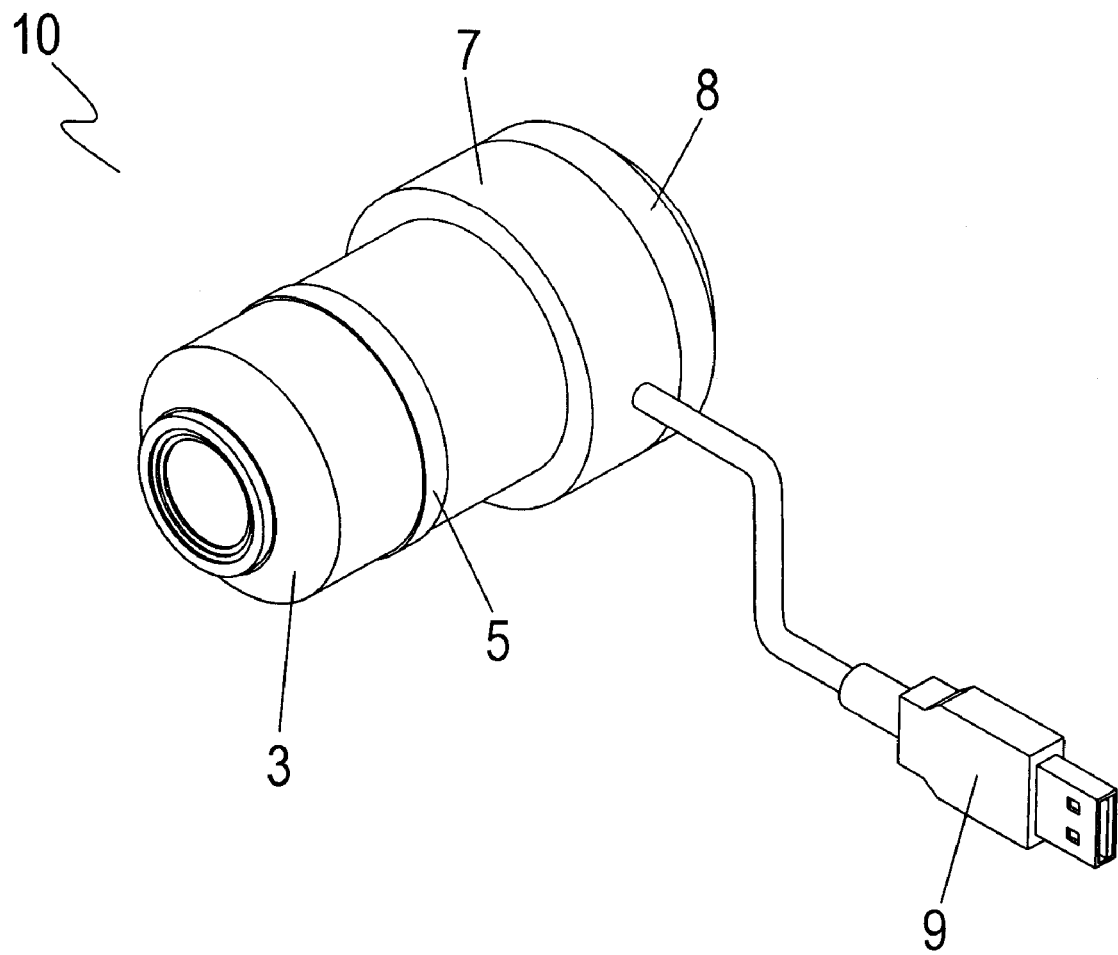
FIG. 2 is another schematic view showing the structural appearance of the microscope device of the multi-function microscope device according to the present invention.

Referring to FIGS. 1 and 2, a multi-function microscope device according to the present invention are structural illustrated. The microscope unit 10 includes following components.

Figure 3:
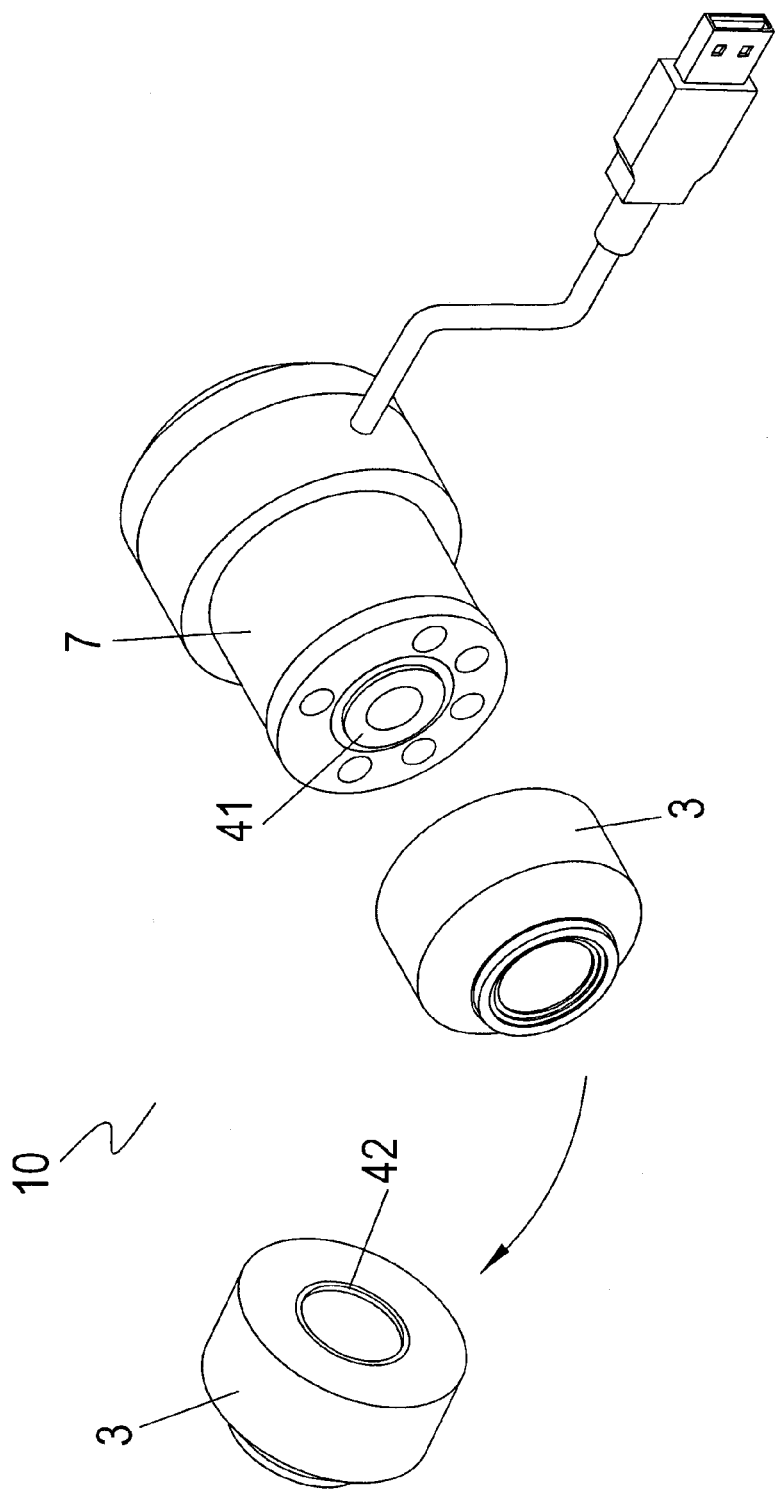
FIG. 3 is a schematic view showing the operation of the microscope device of the multi-function microscope device according to the present invention

A main body 7 internally has at least one of each of light-emitting element 6, S pole magnetic element 41, and transmitting element 9. An inner surface 8 of an outer cap 8 have thread 17 to be screwed to a thread formed to an end surface of the main body 7 to hold internal elements of the main body 7. The light-emitting element 6 projects light to a transparent element 2 by Light Emitting Diodes (LEDs). The S pole magnet element 41 is combined to an N pole magnetic element 42 formed to a microscope lens 3 as shown in FIG. 3.

The transmitting element 9 as shown in Figs. is connected to a computer (not shown) through a Universal Serial Bus (USB) for the user to examine an object. The transmitting element 9 can transmit by wire or a wireless method.

The microscope lens 3 is assembled by the transparent element 2, a lens 1, and the N pole magnetic element 42.

The transparent element 2 provides sufficient light to the lens 1 by refracting the light from the light-emitting element 6.

The lens 1 is a Complementary Metal Oxide Semiconductor (CMOS) digital camera lens. Because of the integration, low consumption, regional access, intelligent pixel, and high frame ratio properties of the CMOS digital camera lens, the power consumption can be lowered, the pixels can be accessed randomly, and data are integrated within a single chip with a low cost.

The lens 1 is combined to the main body 7 by the magnetic principle through the N pole magnetic element 42.

A light adjustment base 5 is capable of tuning a magnitude of light by needs of the user. The microscope unit 10 is assembled by the above components.

With reference to FIG. 3, the operation of the microscope device of the multi-function microscope device according to the present invention is schematically illustrated. The microscope lens 3 can be magnetically switched between different magnifying multiples through the N pole magnetic element 42 thereof and the S pole magnetic element 41.

Figure 4:
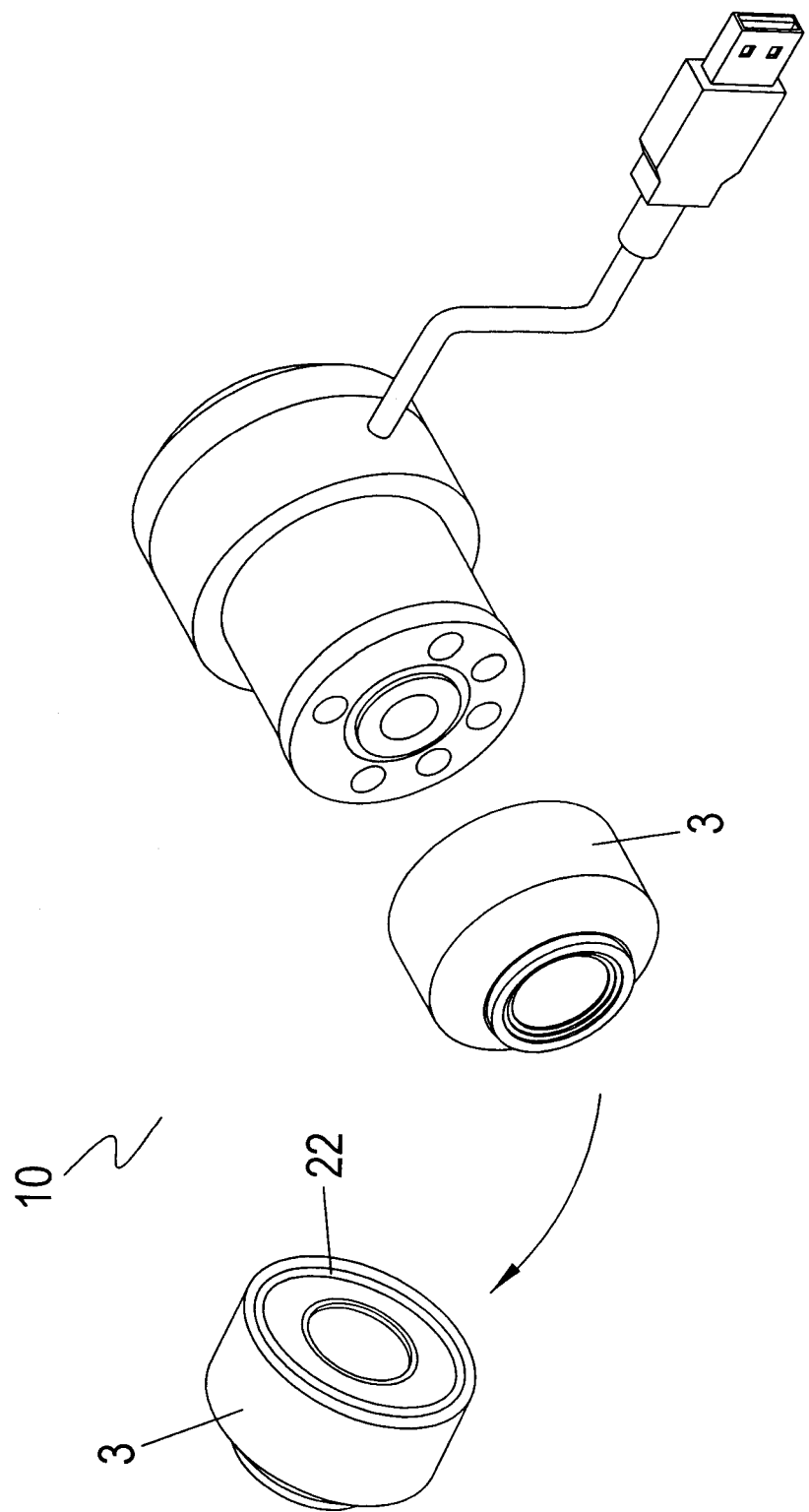
FIG. 4 is a schematic view showing the operation of a transparent element of the multi-function microscope device according to the present invention.
Figure 5:
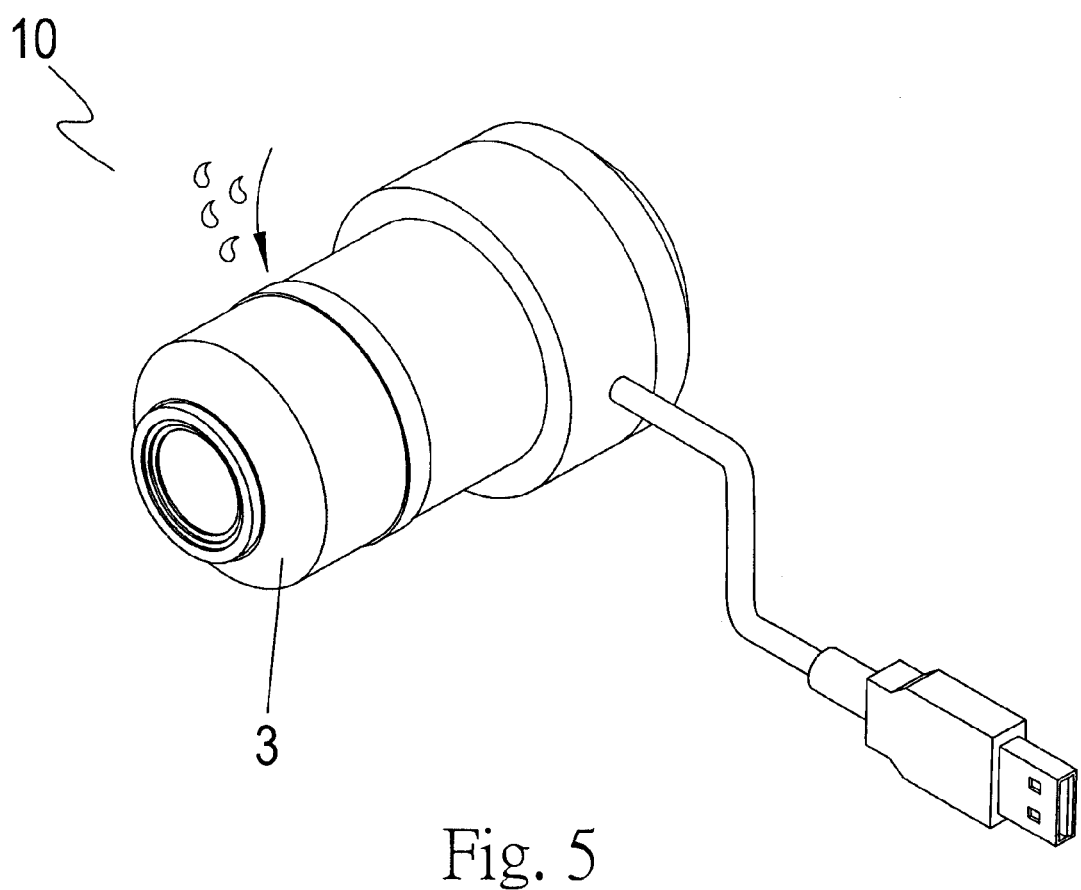
FIG. 5 is another schematic view showing the operation of the transparent element of the multi-function microscope device according to the present invention.

The operation of the transparent element according to the multi-function microscope device of the present invention is illustrated in FIGS. 4 and 5. A water-proof element 22 is arranged to the transparent element 2 of the microscope lens 3 to prevent errors caused by water permeated into the microscope lens 3 while examining or carrying.

Figure 6:
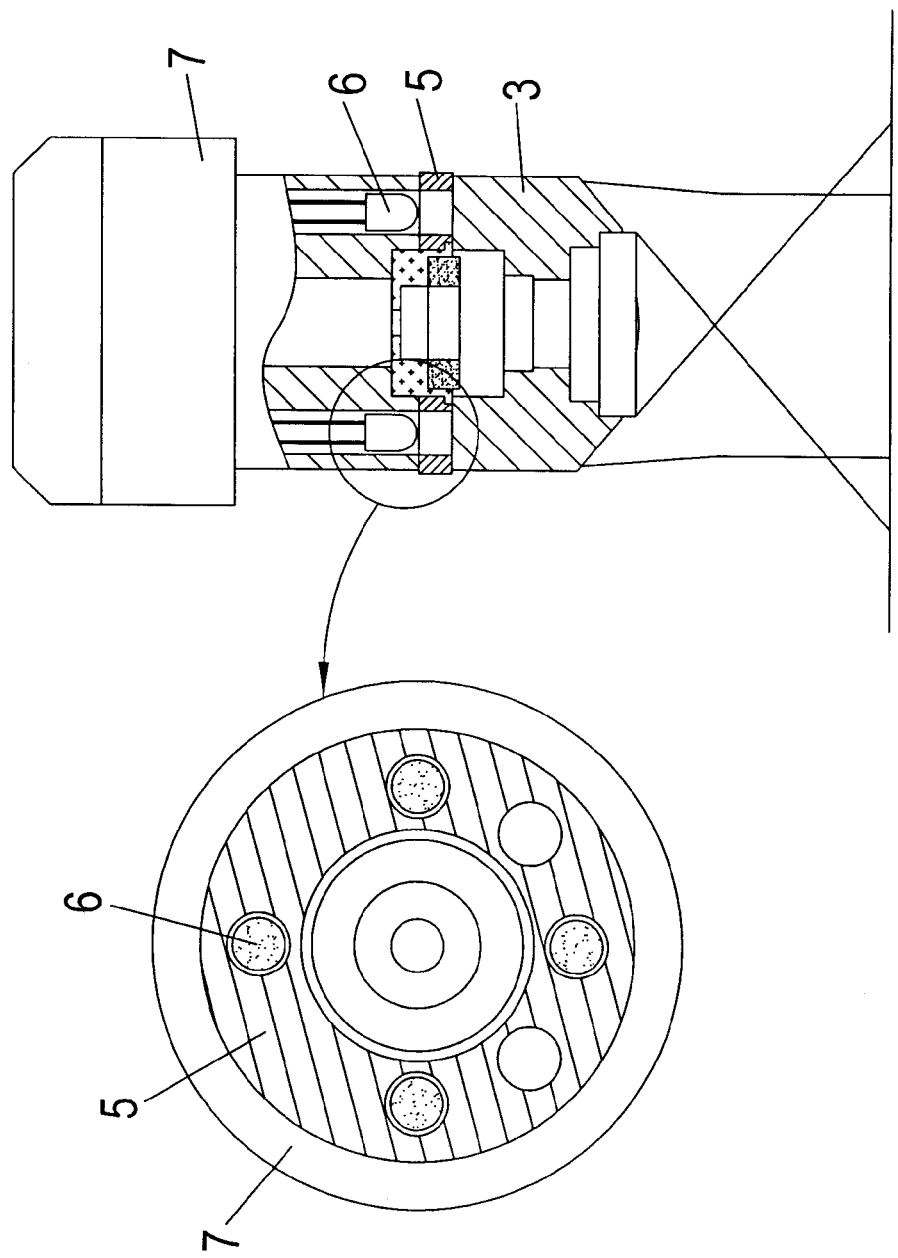
FIG. 6 is a schematic view showing the operation of a light adjustment base of the multi-function microscope device according to the present invention.
Figure 7:
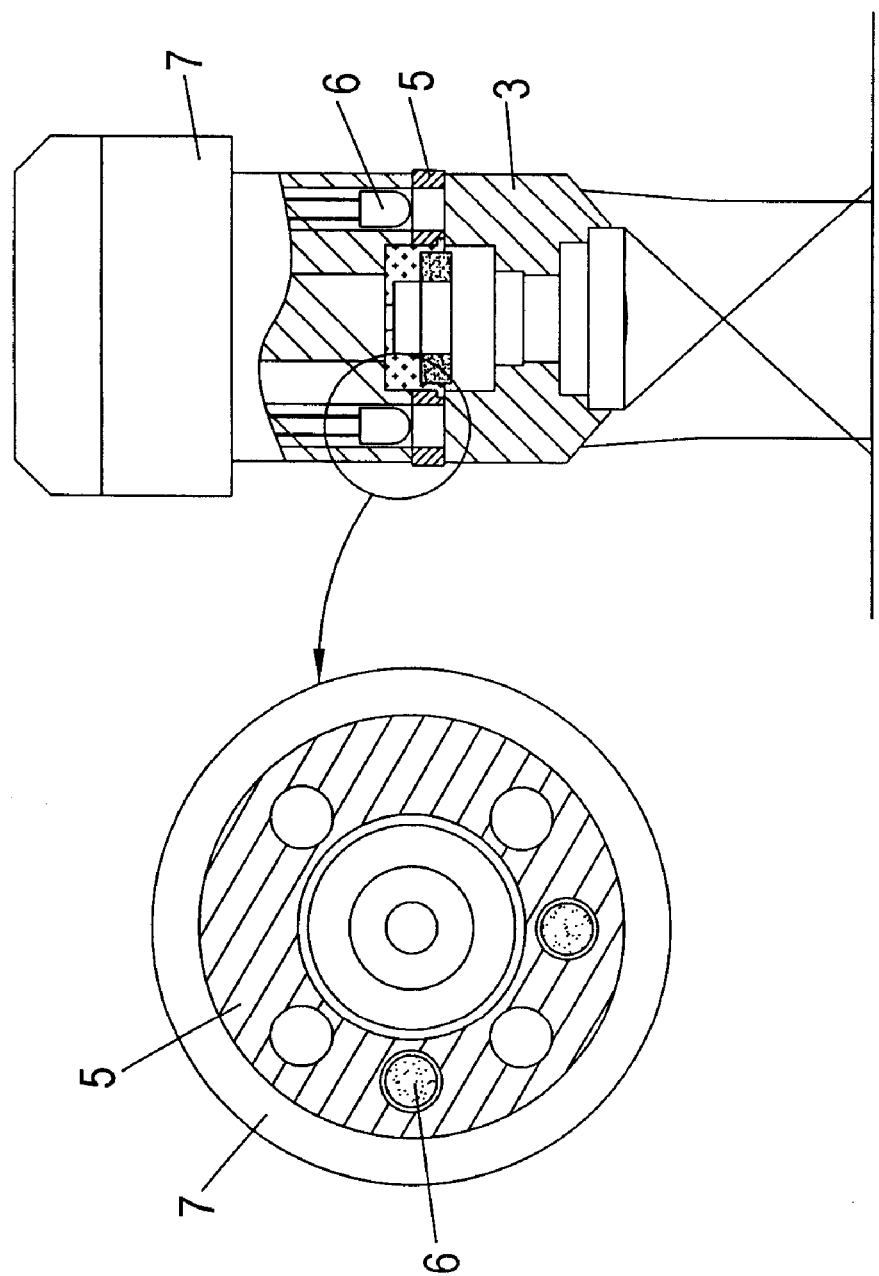
FIG. 7 is another schematic view showing the operation of the light adjustment base of the multi-function microscope device according to the present invention.

Referring to FIGS. 6 and 7, the adjustment of the light adjustment base according to the multi-function microscope device of the present invention are shown. Accordingly, the light adjustment base 5 is arranged between the main body 7 and the microscope lens 3. Through the light adjustment base 5, the user can adjust arrangements of the light-emitting elements 6, for instance, enabling two or four thereof.

Figure 8:
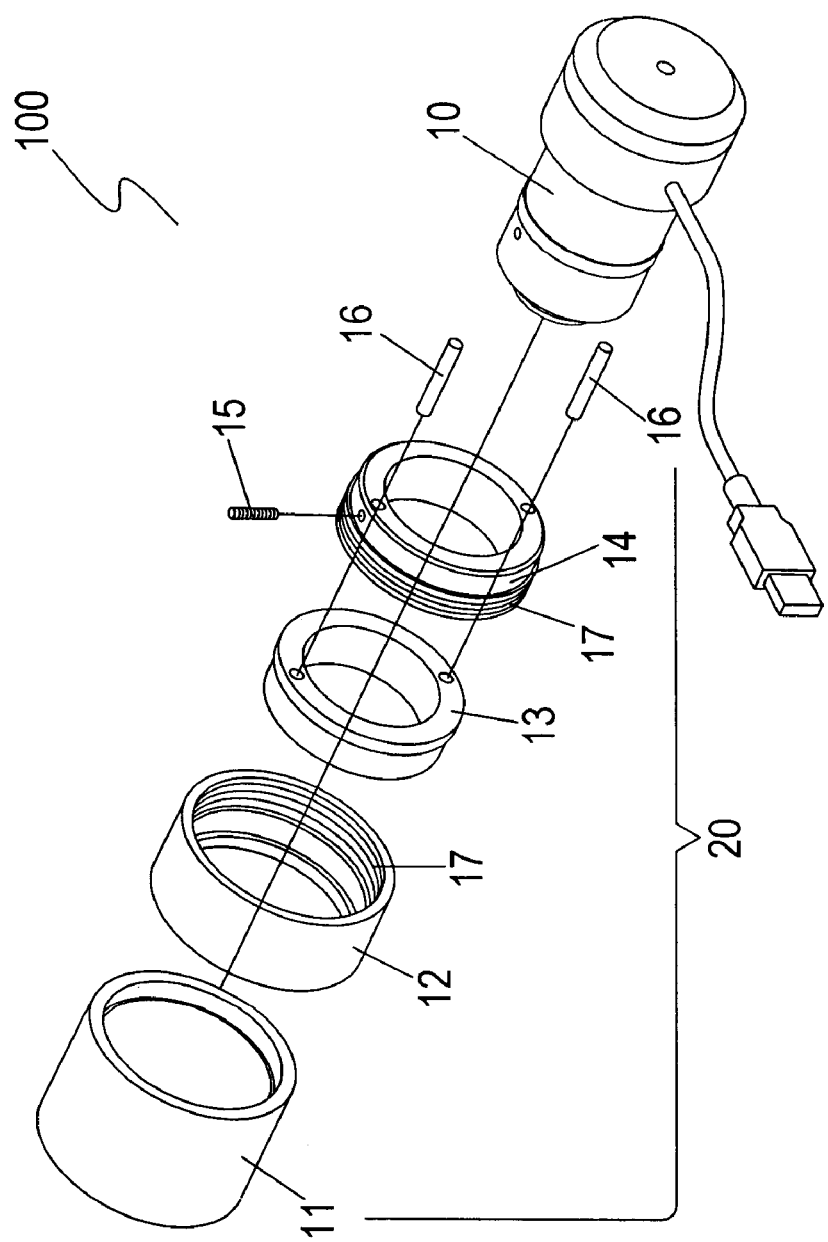
FIG. 8 is a schematic view showing a structural appearance of a focusing element of the multi-function microscope device according to the present invention.
Figure 9:
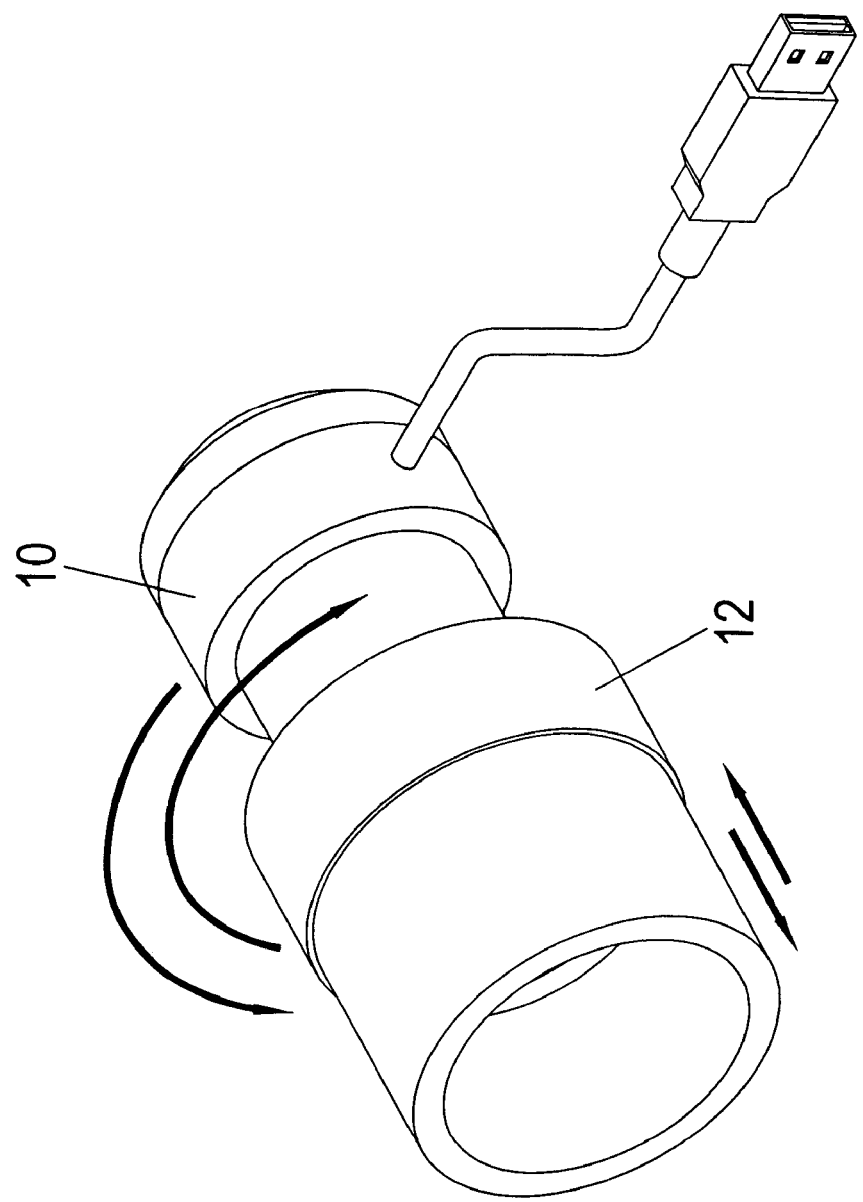
FIG. 9 is a schematic view showing the operation of the focusing element of the multi-function microscope device according to the present invention.

In the FIG. 8, a focusing element of the multi-function microscope device according to the present invention is structural shown. A multi-function microscope device 100 is mainly composed by the microscope device 10 and the focusing element 20. The focusing element 20 is positioned to the microscope device 10 through a focusing element retainer 14 and a positioning element 16 of the focusing element 20, and is fixed by a setscrew 15 to prevent the focusing element retainer from falling. An focus adjusting element 12 has an inner thread 17 engaging to an outer thread 17 formed to the focusing element retainer 14. A cover retainer 13 is arranged between the focusing element retainer 14 and the focus adjusting element 12 so that a cover 11 is set to the cover retainer 13 to protect the microscope lens. The multi-function microscope device is thus assembled.

The operation of the focusing element according to the multi-function microscope device 100 of the present invention is illustrated. The focus adjusting element 12 of the focusing element can be rotated clockwise and count-clockwise to adjust a proper focal length for examining of the microscope device 10.

Figure 10:
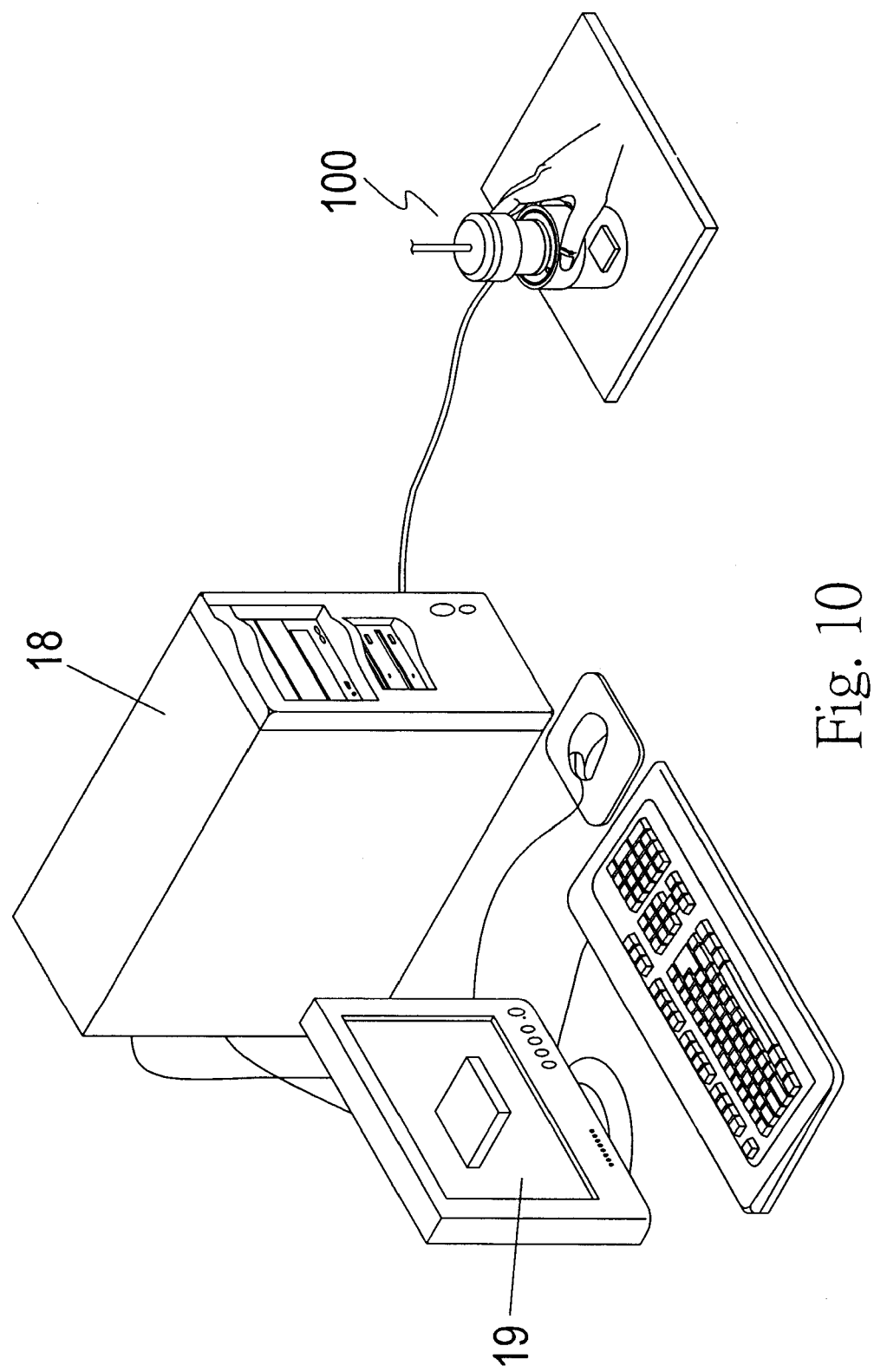
FIG. 10 is a schematic view showing the operation of the multi-function microscope device according to the present invention.
Figure 11:
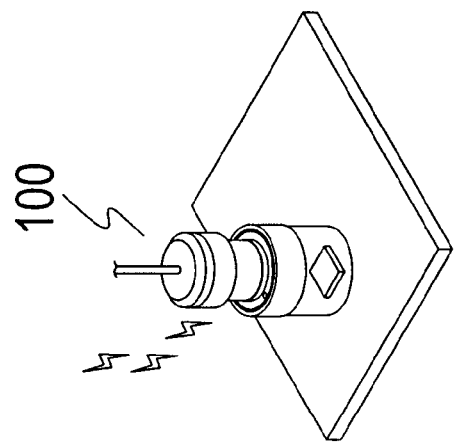
FIG. 11 is another schematic view showing the operation of the multi-function microscope device according to the present invention.
Figure 11:
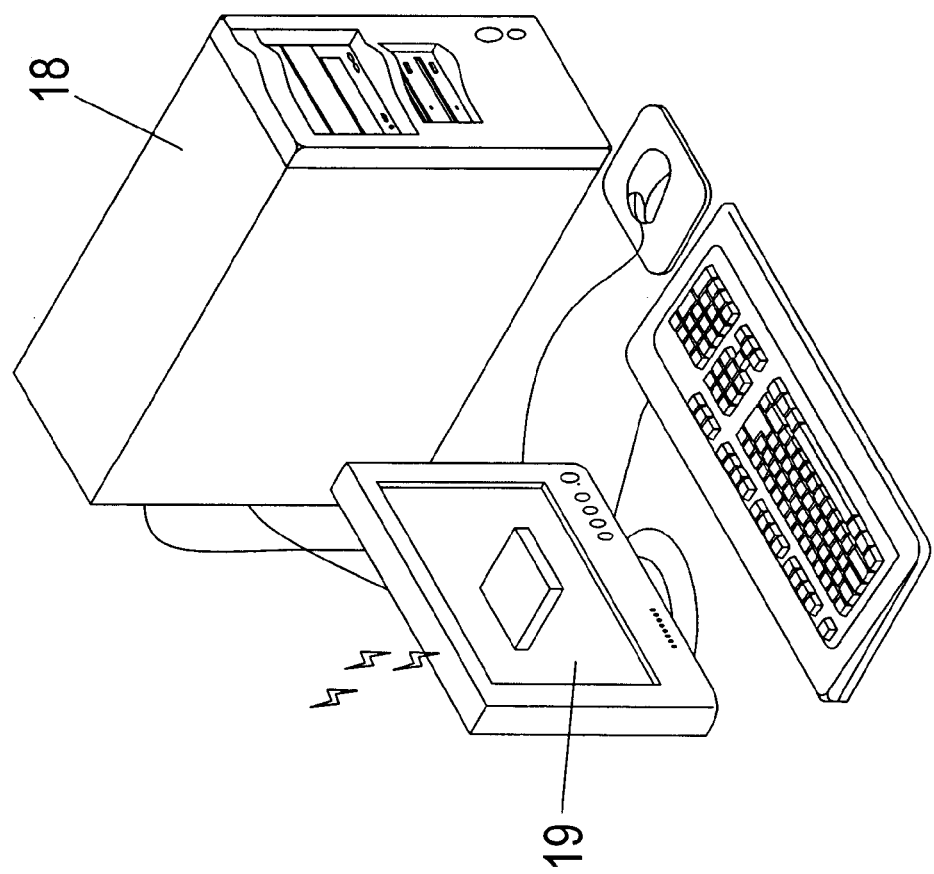

The operation of the multi-function microscope device according to the present invention is illustrated in FIGS. 10 and 11. The multi-function microscope device 100 is connected to a computer main frame 18 through the USB of the transmitting element so that the user can examine the object through a computer screen 19. The transmitting element can transmit by wire or a wireless method.

Figure 12:
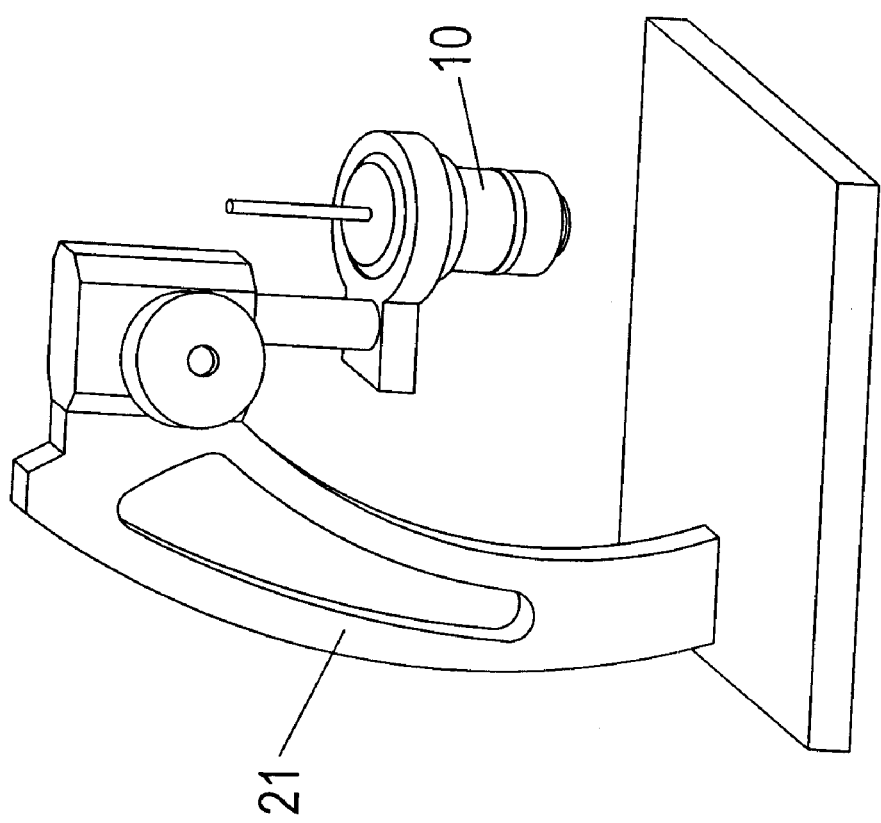
FIG. 12 is a schematic view showing the operation of the microscope device according to the multi-function microscope device according to the present invention.

With reference to FIG. 12, an schematic view showing an embodiment of the multi-function microscope device according to the present invention is shown. The microscope device 10 is installed to a microscope frame 21 to be conveniently carrying and operated.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A multi-function microscope device comprising, in order:
   an outer cap (8) having an inner surface with threads (17);
   a main body (7) having threads formed on a rear surface thereof, and internally having at least one light-emitting element (6) and an S pole magnetic element (41), the at least one light-emitting element (6) is formed on a ring portion of the main body, and the S pole magnetic element (41), upon assembly, is located within a hollow center portion of the ring body and protrudes therefrom;
   a light adjustment base (5) capable of tuning a magnitude of light emitted by the light-emitting element (6) of the main body (7), the light adjustment base (5) being disposed adjacent to the main body (7) and having a form of a ring with a hollow center such that, upon assembly, the S pole magnetic element (4) passes through the hollow center of the light adjusting base (5);
   a microscope lens (3) disposed adjacent to the light emitting base (5) and formed by a transparent element (2), a lens (1), and an N pole magnetic element (42); the transparent element (2) having a form of a ring and being disposed adjacent to the lens (1) thereby providing sufficient light to the lens (1) by refracting light from the light-emitting element (6);
   a focusing element (20) disposed adjacent to the microscope lens (3) and formed by a focusing element retainer (14), a focus adjusting element (12), a cover retainer (13), and a cover (11); and
   wherein, upon use, the light-emitting element (6) projects light to the transparent element (2) and the S pole magnet element (41) attaches to the N pole magnetic element (42) of the microscope lens (3).

2. The multi-function microscope device as claimed in claim 1, wherein the light adjustment base adjusts a magnitude of light according to a refraction of an object to be examined.

3. The multi-function microscope device as claimed in claim 1, wherein a water-proof element is provided on the transparent element of the microscope lens to prevent errors caused by water permeated into the microscope lens.

4. The multi-function microscope device as claimed in claim 1, wherein the main body (7) further comprises a transmitting element connected to a computer through a Universal Serial Bus (USB) for a user to examine an object; and the transmitting element transmits by way of one of a wire or a wireless method.

\* \* \* \* \*